Nov. 11, 1958
H. G. LANKENAU
2,859,832
ENTRAINMENT SEPARATOR
Filed April 27, 1954
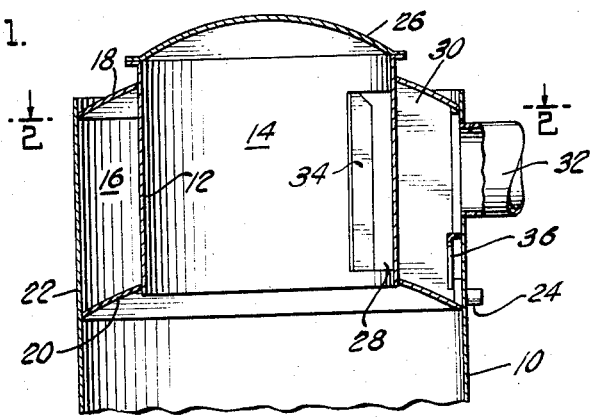
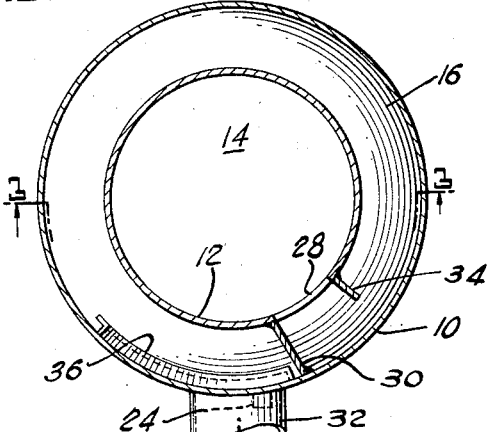
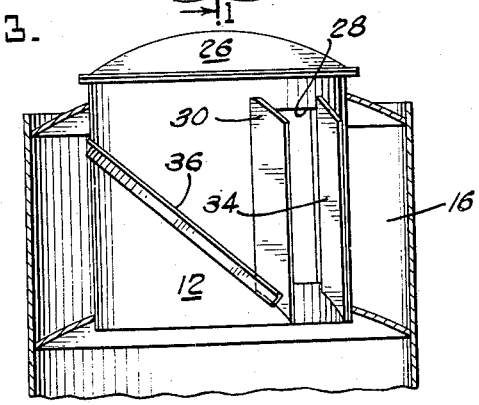
INVENTOR:
HENRY G. LANKENAU
BY
Curtis, Morris & Safford
ATTORNEYS United States Patent Office 2,859,832
Patented Nov. 11, 1958

2,859,832

ENTRAINMENT SEPARATOR

Henry G. Lankenau, Clifton, N. J., assignor to Chicago Bridge and Iron Company, Chicago, Ill., a corporation of Illinois Application April 27, 1954, Serial No. 425,911

5 Claims. (Cl. 183—79)

This invention relates to centrifugal separators and more particularly to a novel vapor-liquid entrainment separator for separating entrained liquids from vapors.

Entrainment separators of the type with which the present invention is concerned are commonly mounted at the top of each evaporator body of a multiple effect evaporator to separate entrained droplets of liquor from the vapors evolved in the effect. Since the vapors generated in each effect are used as the heating medium in the next effect it is important that the vapors be freed of entrained droplets of liquor to avoid losses of the liquor being evaporated, provide a condensate that has a relatively low concentration of dissolved solids therein, and improve the thermal efficiency of the evaporator. Moreover it is important that the separation be effected with a minimum pressure drop through the separator. It is accordingly an object of the present invention to provide an entrainment separator capable of separating liquid droplets from a vapor with improved effectiveness. It is another object of the invention to provide a centrifugal separator having a novel structure for increasing the effective centrifugal force in the separator and preventing re-entrainment of the separated liquor at the discharge opening of the separator. Other objects of the invention will be in part obvious and in part pointed out hereafter.

The objects and advantages of the present invention can best be understood and appreciated by reference to the accompanying drawing, which illustrates an entrainment separator incorporating a preferred embodiment of the present invention and wherein:

Figure 1 is a central vertical section through the separator taken on the line 1—1 of Figure 2 and showing the general arrangement of the central chamber and annular chamber of the separator;

Figure 2 is a horizontal section taken on line 2—2 of Figure 1 and particularly showing the locations of the partition that divides the annular space and the flow-constricting baffle of the separator; and, Figure 3 is a vertical section taken on the line 3—3 of Figure 2, i. e. it is a side elevation of the separator with the outer wall removed, and particularly shows the construction of the liquid diverting channel and its location in relation to the partition and baffle.

Referring to the drawing and particularly to Figure 1, the separator there shown comprises an outer cylindrical wall 10 which may be made integral with the top of an evaporator body and an inner cylindrical wall 12 that defines a central space 14 and cooperates with the outer wall 10 to partially define an annular space 16. The annular chamber 16 is further defined by a pair of vertically spaced rings 18 and 20 that extend from the inner to the outer wall. The rings 18 and 20 slope downwardly and outwardly in such manner that the ring 20 cooperates with the outer wall 10 to define an annular trough 22 in which the separated liquor can collect, and a separated liquor discharge connection 24 is formed in the wall 10 and communicates with trough 22 to provide for removal of the separated liquor from the separator. The central chamber 14 is provided at its top with a suitable cover 26, and the bottom of chamber 14 is open to form an inlet for vapor and entrained liquor coming from the vapor space of the evaporator.

Referring now to Figure 2 as well as to Figure 1, the inner wall 12 is provided at one point in its periphery with an elongated opening 28 which provides a means whereby vapors from the central chamber 14 can flow into the annular chamber 16. Extending from the inner wall 14 to the outer wall 10 at one side of the opening 28 there is a partition 30 which as shown in Figure 1 abuts the rings 18 and 20 at its top and bottom respectively and thus blocks the annular chamber 16 completely at this point. On the other side of partition 30 from the opening 28 the wall 10 is provided with a vapor discharge connection 32. The construction is such that vapors from the central chamber 14 flow through the opening 28 to annular chamber 16 make a substantially complete circuit of the chamber 16 and then flow out through the vapor discharge connection 32. As the vapors flow around the annular chamber 16 entrained liquor is thrown by centrifugal force against the outer wall 10, flows down into the trough 22 and out of the separator through the discharge connection 24.

In order to promote the centrifugal separation of the liquor droplets, the annular chamber 16 is provided with a radial baffle 34 which is secured to the inner wall 12 at the side of opening 28 that is remote from partition 30. As best shown in Figure 3, the baffle 34 abuts rings 18 and 20 at its top and bottom respectively, and as shown in Figure 2 it extends approximately half way from the inner wall 12 to the outer wall 10. The baffle 34 cooperates with outer wall 10 to diminish the cross-sectional area of the chamber 16 and thereby increases the vapor velocity just after the vapor has entered chamber 16 through opening 28. This increase in vapor velocity correspondingly increases the centrifugal force available for forcing the liquid droplets toward the outer wall and hence materially improves the separation of the entrained liquor from the vapors.

As explained above the separated liquor flows down the inner surface of external wall 10 to the trough 22. As the vapors approach the discharge connection 32 there is some tendency for the liquor flowing down the wall 10 to be re-entrained and drawn out through the discharge connection 32 with the outgoing vapors. In order to prevent such re-entrainment, a liquor diverting channel 36 is provided just upstream of the vapor discharge 32. As indicated in the drawings the channel 36 may be conveniently made by securing a metal strip of right-angular cross-section to the outer wall in such manner as to form a channel of U-shaped cross-section with the opening of the U confronting the bottom of annular chamber 16. As best shown in Figure 3, channel 36 extends from a point on the wall 10 near the upper ring 18 and above the vapor discharge 32 downwardly at an angle in the direction of vapor flow and between the vapor and liquor discharge connections to a point near the partition 30. The angle of slope of the channel 36 may be conveniently be about 45°.

From the foregoing description it should be apparent that the present invention provides a structure capable of achieving the several objects set forth at the beginning of the present specification. The baffle 34 substantially restricts the cross-sectional area of annular chamber 16, thereby increasing the vapor flow rate and the effective centrifugal force acting in a direction to separate the entrained droplets of liquor. The liquor diverting channel 36 positioned upstream of the vapor discharge connection effectively diverts the separated liquor downwardly toward the liquor discharge connection.

It is of course to be understood that the foregoing description is illustrative only, and that numerous changes can be made therein without departing from the spirit of the invention as defined in the appended claims. While the separator has been illustratively described as applied to one of the effects of a multiple effect evaporator, it will be apparent to those skilled in the art that it can also be used in conjunction with other types of process equipment wherein entrained liquids must be separated from vapors.

I claim:

1. A vapor-liquid entrainment separator comprising a pair of concentric cylindrical inner and outer walls defining a central chamber and an annular chamber between said walls, closure means cooperating with said walls to close the top and bottom of said annular chamber and the top of said central chamber, the bottom of said central chamber forming an inlet opening through which vapors containing entrained liquid can enter said separator, a radial partition extending through said annular chamber from said inner wall to said outer wall, said inner wall being provided with a vertically elongated opening, one vertical side of which is adjacent to said partition, and said outer wall being provided with a discharge connection adjacent to the other side of said partition, whereby vapors entering said central chamber flow through said inner wall opening, circumferentially around said annular chamber and out said discharge connection, and a planar radial baffle secured to said inner wall at the vertical side of said opening opposite said partition and extending radially from said inner wall into said annular chamber, whereby vapors flowing from said central chamber through said opening are forced, while flowing in a curved path, against said outer wall to promote separation of entrained liquid therefrom.

2. A separator according to claim 1 and wherein said radial baffle extends approximately half-way from said inner to said outer wall.

3. A vapor-liquid entrainment separator comprising a pair of concentric cylindrical inner and outer walls defining a central chamber and an annular chamber between said walls, closure means cooperating with said walls to close the top and bottom of said annular chamber and the top of said central chamber, the bottom of said central chamber forming an inlet opening, through which vapor containing entrained liquid can enter said separator, a radial partition extending through said annular chamber from said inner wall to said outer wall, said inner wall being provided with an opening adjacent to one side of said partition and said outer wall being provided with a discharge connection adjacent to the other side of said partition, whereby vapors entering said central chamber flow through said inner wall opening, circumferentially around said annular chamber and out said discharge connection, said outer wall also being provided with a liquid drain connection located below said discharge connection and communicating with said annular chamber, and a liquid-diverting baffle secured to the inner surface of said outer wall adjacent to and upstream of said discharge connection, said baffle being of channel-shaped cross-section with the open side of the channel confronting the bottom of said annular chamber and sloping downwardly in the direction of flow of vapor from a point above said discharge connection to a point between said discharge connection and said liquid drain connection to divert separated liquid toward said drain connection.

4. A separator according to claim 3 and wherein said liquid-diverting baffle slopes downwardly in the direction of vapor flow at an angle of about 45°.

5. A vapor-liquid entrainment separator comprising a pair of concentric cylindrical inner and outer walls defining a central chamber and an annular chamber between said walls, a pair of spaced flanges interconnecting said inner and outer walls and providing top and bottom closures for said annular chamber, a closure secured to the top of said inner wall to close the top of said central chamber, the bottom of said central chamber forming an inlet opening through which vapors containing entrained liquid can enter said separator, a radial partition extending through said annular chamber from said inner wall to said outer wall, said inner wall being provided with a vertically elongated opening, one side of which is located adjacent to one side of said partition, and said outer wall being provided with a discharge connection adjacent to the other side of said partition, whereby vapors entering said central chamber flow through said inner wall opening, circumferentially around said annular chamber and out said discharge connection, said outer wall also being provided with a liquid drain connection located below said vapor discharge connection and communicating with said annular chamber, a planar radial baffle secured to the vertical side of said opening opposite said partition and extending radially into said annular chamber, whereby vapors flowing from said central chamber through said opening are forced against said outer wall to promote separation of entrained liquor therefrom, a liquid-diverting baffle secured to the inner surface of said outer wall adjacent to and upstream of said discharge connection, said last-named baffle being of channel-shaped cross-section with the open side of said channel confronting the bottom of said annular chamber and sloping downwardly in the direction of vapor flow between said vapor connection and said drain connection to divert separated liquid toward said drain connection.

References Cited in the file of this patent

UNITED STATES PATENTS

| 677,357 | Hyde | July 2, 1901 |
| 1,866,663 | Morris | July 12, 1932 |
| 2,256,524 | McKelvey | Sept. 23, 1941 |
| 2,452,465 | Hughes | Oct. 26, 1948 |
| 2,542,041 | Mason et al. | Feb. 20, 1951 |
| 2,547,190 | Wilson | Apr. 3, 1951 |
| 2,551,890 | Love | May 8, 1951 |
| 2,616,563 | Hebb | Nov. 4, 1952 |

FOREIGN PATENTS

| 1,122,746 | France | May 28, 1956 |